(12) United States Patent
McKinney et al.

(10) Patent No.: US 9,197,772 B2
(45) Date of Patent: Nov. 24, 2015

(54) DYNAMIC MULTILINGUAL PRINT DRIVER

(71) Applicants: Alan Lane McKinney, Gainesville, FL (US); William Kenneth Clark, Gainesville, FL (US)

(72) Inventors: Alan Lane McKinney, Gainesville, FL (US); William Kenneth Clark, Gainesville, FL (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/017,294

(22) Filed: Sep. 3, 2013

(65) Prior Publication Data

US 2015/0062605 A1 Mar. 5, 2015

Related U.S. Application Data

(63) Continuation-in-part of application No. 13/843,652, filed on Mar. 15, 2013, and a continuation-in-part of application No. 13/843,586, filed on Mar. 15, 2013, and a continuation-in-part of application No. 13/843,502, filed on Mar. 15, 2013.

(60) Provisional application No. 61/648,957, filed on May 18, 2012, provisional application No. 61/648,949, filed on May 18, 2012, provisional application No. 61/648,941, filed on May 18, 2012.

(51) Int. Cl.
*G06F 15/00* (2006.01)
*H04N 1/00* (2006.01)
*G06F 3/12* (2006.01)
*G06F 9/44* (2006.01)

(52) U.S. Cl.
CPC .......... *H04N 1/00498* (2013.01); *G06F 9/4448* (2013.01); *G06F 3/1205* (2013.01); *G06F 3/1254* (2013.01); *G06F 9/4411* (2013.01)

(58) Field of Classification Search
CPC ..................................................... G06F 9/4448
USPC ......................................................... 358/1.13
See application file for complete search history.

(56) References Cited

U.S. PATENT DOCUMENTS 6,314,517 B1  11/2001  Moses et al.
6,327,611 B1  12/2001  Everingham
(Continued)

FOREIGN PATENT DOCUMENTS

EP       1999557 A1    12/2008
EP       2 083 351 A1   7/2009
(Continued)

OTHER PUBLICATIONS

EP 14183338.4 Extended Search Report dated Mar. 12, 2015.

*Primary Examiner* — Saeid Ebrahimi Dehkordy
(74) *Attorney, Agent, or Firm* — Hamilton, Brook, Smith & Reynolds, P.C.

(57) ABSTRACT

In one example, we describe a method and system for displaying the Printing Preferences UI and graphical user interface and for the dynamic multilingual print driver. In one example, the system determines the language of the currently-logged-in user. In one example, the system determines the supported language that most closely matches the user's language. If unable to match, it uses the system's default language that was set during the initial installation. If that is not available, then it uses English as the language and declares an error (for the user or administrator), because the system has got a corrupted installation. Other details and variations are also presented here.

20 Claims, 16 Drawing Sheets

(56) References Cited

U.S. PATENT DOCUMENTS

| | | |
|---|---|---|
| 6,452,691 B1 | 9/2002 | Marshall |
| 6,584,466 B1 | 6/2003 | Serbinis et al. |
| 6,625,642 B1 | 9/2003 | Naylor et al. |
| 6,671,805 B1 | 12/2003 | Brown et al. |
| 6,944,648 B2 | 9/2005 | Cochran et al. |
| 6,959,382 B1 | 10/2005 | Kinnis et al. |
| 7,360,079 B2 | 4/2008 | Wall |
| 7,412,374 B1 | 8/2008 | Seiler et al. |
| 8,271,703 B2 | 9/2012 | Wang et al. |
| 8,339,624 B2 | 12/2012 | Sakakibara |
| 2003/0005100 A1 | 1/2003 | Barnard et al. |
| 2003/0079006 A1 | 4/2003 | White et al. |
| 2004/0156071 A1 | 8/2004 | Lay et al. |
| 2004/0246505 A1 | 12/2004 | Oh |
| 2006/0173671 A1 | 8/2006 | Okawa |
| 2006/0256392 A1 | 11/2006 | Van Hoof et al. |
| 2007/0002355 A1* | 1/2007 | Kai .................. 358/1.13 |
| 2007/0016861 A1 | 1/2007 | Salomaa et al. |
| 2007/0017971 A1 | 1/2007 | Im |
| 2007/0130588 A1 | 6/2007 | Edwards et al. |
| 2008/0005312 A1 | 1/2008 | Boss et al. |
| 2008/0127183 A1 | 5/2008 | Emerson et al. |
| 2009/0303519 A1 | 12/2009 | Shimatani et al. |
| 2010/0100832 A1 | 4/2010 | Wang et al. |
| 2010/0225958 A1 | 9/2010 | Selvaraj et al. |
| 2010/0225959 A1 | 9/2010 | Selvaraj et al. |
| 2010/0274863 A1 | 10/2010 | Foygel et al. |
| 2010/0280956 A1 | 11/2010 | Chutorash et al. |
| 2011/0077802 A1 | 3/2011 | Halloran et al. |
| 2011/0205576 A1 | 8/2011 | Halron et al. |
| 2012/0117497 A1 | 5/2012 | Uola et al. |
| 2012/0191831 A1 | 7/2012 | Kanzabedian et al. |
| 2012/0320406 A1 | 12/2012 | Giannetti |
| 2013/0311386 A1 | 11/2013 | Tehranchi et al. |
| 2013/0311420 A1 | 11/2013 | Tehranchi et al. |
| 2014/0115492 A1 | 4/2014 | Tehranchi et al. |
| 2015/0067144 A1 | 3/2015 | Scovill |

FOREIGN PATENT DOCUMENTS

| | | |
|---|---|---|
| EP | 2 466 457 A1 | 6/2012 |
| EP | 2 860 625 A1 | 4/2015 |
| WO | WO 2007/105577 A1 | 9/2007 |

* cited by examiner

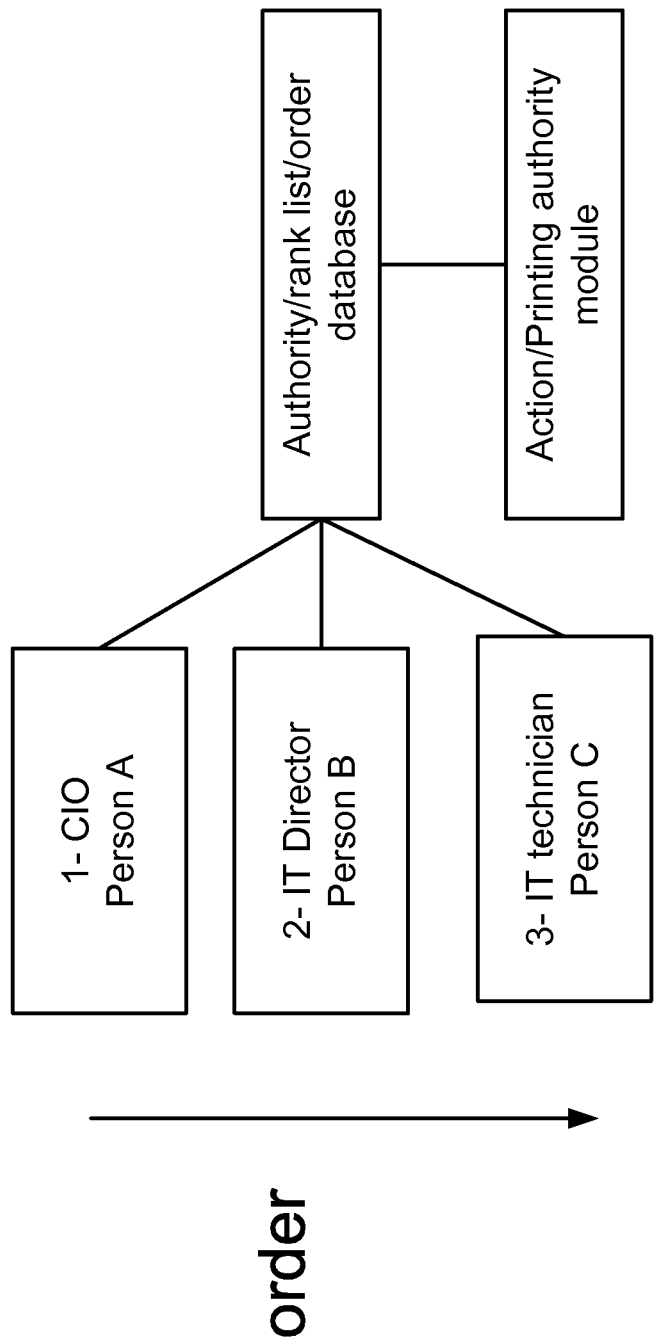

DYNAMIC MULTILINGUAL PRINT DRIVER

RELATED APPLICATIONS

This application is a continuation-in-part of the following: U.S. application Ser. No. 13/843,652, filed Mar. 15, 2013 and also U.S. application Ser. No. 13/843,586, filed Mar. 15, 2013, each of which claims the benefit of U.S. Provisional Application No. 61/648,949, filed May 18, 2012 and U.S. Provisional Application No. 61/648,957, filed May 18, 2012; and also U.S. application Ser. No. 13/843,502, filed Mar. 15, 2013, which claims the benefit of U.S. Provisional Application No. 61/648,941, filed on May 18, 2012. The entire teachings of the above applications are incorporated herein by reference.

BACKGROUND OF THE INVENTION

In a network of computers and printers, for example, a printer driver communicates with a web services-enabled printer to get device capabilities and printing preference information. One example is described in US Patent Application 20100225959. The display names of the settings are available in several different languages, all of which are sent to the printer driver when it queries the printer. The driver then builds the UI with whatever localized data it has available, and it displays some ability to handle multiple languages: The value of the language setting indicates a language in which to display data to the user that is currently logged in to the computer system. Thus, if a different user logs in to the computer system and the different user is associated with a different language setting than the language setting for the previous user (e.g., French instead of English), then some of the printing features and/or options are displayed in a GUI in the different language, depending on whether those printing features and/or options are associated with display names in the different language.

Another example is US20100225958, which mainly focuses on getting printing preference data from a web services enabled printer and does not go into multilingual UI.

Another example is EP2083351, which defines a method of dynamically querying a device and generating a driver based on the device's capabilities. In the specification, it mentions that it may define localized strings, but there is no mention of being able to change languages or provide more than one language from the same driver.

Another example is U.S. Pat. No. 8,271,703, which is a method for providing UI modifiers from a device. In the specification, it mentions the device providing localized strings to the UI, but again, there is no mention of supporting multiple languages simultaneously.

Another example is U.S. Pat. No. 8,339,624, which describes a way for users on an MFP to select the language when they scan a job. That language information is then attached to the job and persists as the users interact with that job in a queue of jobs. So, each job can have a different language, as selected by the user, and the display automatically changes to match the selected job.

Another example is US20040246505, which describes setting the language on the printer interface based on the language selected, when installing the printer driver. The computer then tells the printer what language to use.

Another example is US20040156071, which describes a way to indicate the desired language to the printer so that messages from the printer appear in the desired language.

Another example is US20090303519, which describes a way for the printer to send a compressed file with language dependent information to the printer driver for use in the UI.

Another example is EP1999557, which describes a way for the printer to send a compressed file with language dependent information to the printer driver for use in the UI.

Another example is US20060173671, which is a utility to convert the strings within the printer driver from one language to another.

However, the invention and embodiments described here, below, have not been addressed or presented in any single or combination of prior art.

SUMMARY OF THE INVENTION

In one embodiment, we describe a method and system for displaying the Printing Preferences UI and graphical user interface and for the dynamic multilingual print driver. In one embodiment, the system determines the language of the currently-logged-in user. In one embodiment, the system determines the supported language that most closely matches the user's language. If unable to match, it uses the system's default language that was set during the initial installation. If that is not available, it uses English as the language and declares an error (for the user or administrator), because the system has got a corrupted installation. Other details and variations are also presented here.

BRIEF DESCRIPTION OF THE DRAWINGS

FIG. 16 is for one embodiment, as an example, for a system for various authorities, in an ordered list.

DETAILED DESCRIPTION OF THE PREFERRED EMBODIMENTS

Figure 1:
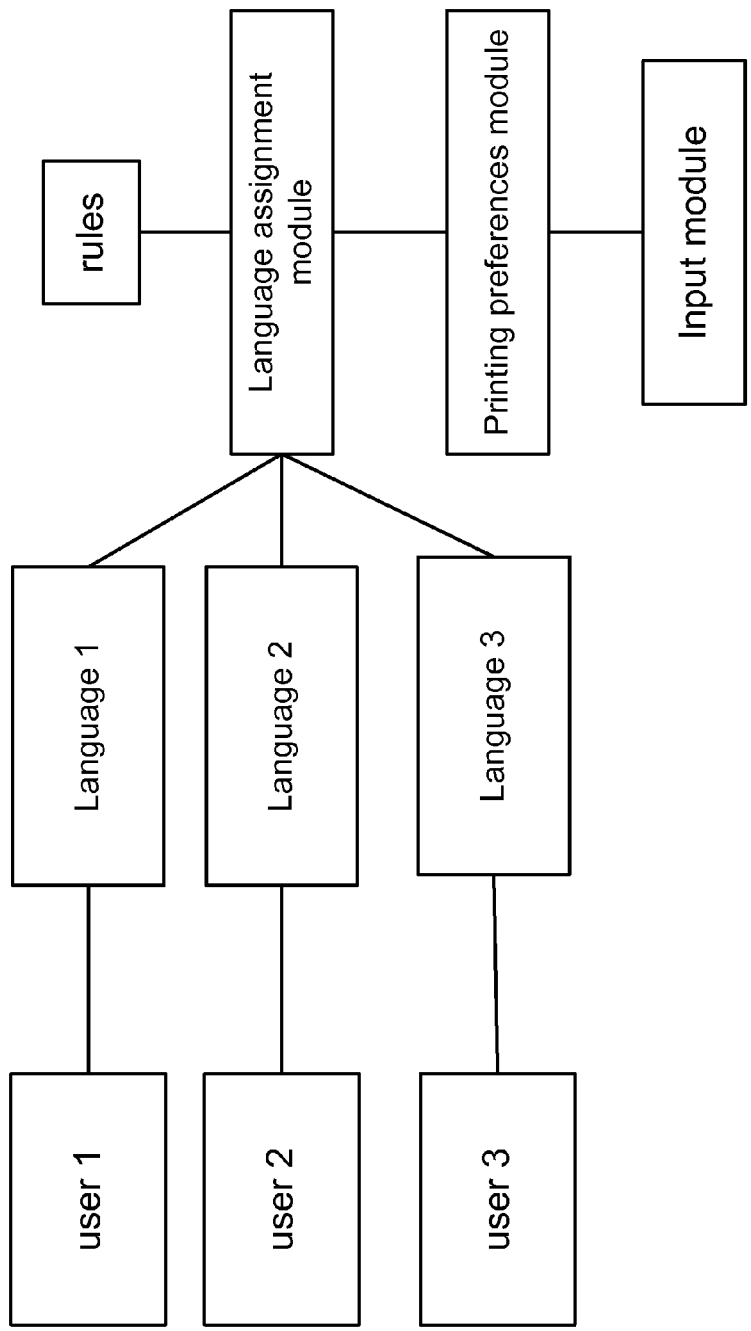
FIG. 1 is for one embodiment, as an example, for a system for multiple users and multiple languages.

In one embodiment, we describe a method and system for displaying the Printing Preferences UI and graphical user interface and for the dynamic multilingual print driver. The interface with the user can be by (or using) word/text, graphical/display, menu, 3D-hierarchical menu, voice command and voice recognition, using stylus, or using a mouse. In one embodiment, the system determines the language of the currently-logged-in user. In one embodiment, the system uses a menu to ask the user to determine the language of the current user. In one embodiment, the system uses a menu or window to ask the admin for the system to determine the language of the current user. In one embodiment, the system uses the history of the web sites the user has visited recently, to determine the language of the current user, based on the language of those web sites. In one embodiment, the system uses the registration file of the user, to determine the language of the current user.

In one embodiment, the system uses the preference file of the user for multiple languages, for a list of priority of the languages used by the user. For example, it has the first choice as English, the $2^{nd}$ choice as French, and the $3^{rd}$ choice as German. In one embodiment, the system uses a voice-to-text conversion module for the same choices as above, for list of preference for different languages, for the output for interfacing and communication with the user, with the same order of priority, for conveying the same information or make it easier to interface with the user, by voice or sound. In one embodiment, the system uses a font preference list for the written output format of the text for the user to see or review, based on the user's specification or those of the admin.

In one embodiment, the system uses a preference list for different applications, such as accounting data or files, to be applied in a specific language. In one embodiment, the system uses a preference list for different files or file names or extension names, to be applied in a specific language. In one embodiment, the system uses a preference list for different functions, such as business or marketing, to be applied in a specific language. In one embodiment, the system uses a preference list for different circumstances, such as if an event happens or a condition satisfied, to be applied in a specific language. In one embodiment, the system uses a rules engine for that purpose.

In one embodiment, the system uses a preference list for different time or day or season, such as in the morning time periods, to be applied in a specific language. In one embodiment, for example, that time period correlates to a specific language for a specific reviewer available for that time period, to receive the file or text. In one embodiment, the system uses a preference list for the receiver(s), such as a person in another country, to be applied in a specific language.

In one embodiment, the system determines the supported language that most closely matches the user's language. For example, if the Spanish version is not available, it is matched with a close language, such as Portuguese. In one embodiment, if unable to match, it uses the system's default language that was set during the initial installation or by admin or by the user. If that is not available, it uses English as the language and declares an error with a message (for the user or administrator to notice), because the system has got a corrupted installation.

In one embodiment, the system loads the resources for the driver. In one embodiment, the system determines the current printing preferences through one of these methods (in order):
Load application instance print preferences, used during the last print operation, from the application "devmode".
Load system print preference defaults, as stored in the default devmode for the printer.
Load initial print preference defaults from XML file, included with the driver.

In one embodiment, the system queries the port for the information needed to communicate with the input service. In one embodiment, the system requests the current list print preferences from the server in the user's language.

In one embodiment, for inside the server, it evaluates the current capabilities to present to this printer. In one embodiment, it loads the print preference strings that match the requested language. In one embodiment, it returns the print preferences to the driver.

In one embodiment, for back inside the driver, it merges the print preference defaults with the current print preference list from the server. In one embodiment, it builds the UI based on the current print preferences list, using the current language strings. In one embodiment, it displays the UI. Once it gets approval ("OK"), it converts the user's print preference selections to a job ticket and stores that in application devmode.

In one embodiment, when the document is printed, the driver determines the current printing preferences through one of these methods (in order):
Load application instance print preferences used during the last print operation from the application devmode.
Load system print preference defaults as stored in the default devmode for the printer.
Load initial print preference defaults from XML file included with the driver.

In one embodiment, it appends the job ticket containing the printing preferences to start a job. In one embodiment, it delivers job to a printer or queues it for the later release.

Some variations of the above teachings: In one embodiment, it supports printer sharing with clients of differing architectures. In one embodiment, the drivers of multiple architectures (e.g., 32 bit, 64 bit, Windows 8, XP, or the like) can be installed on a print server without any special requirements and without having to perform the install remotely from a system of the target architecture.

In one embodiment, the driver fully supports Microsoft's Point-N-Print technology. Users can connect to a printer being shared from a central system, and the appropriate printer driver is automatically downloaded and installed onto the client system.

In one embodiment, the driver supports multiple user languages (e.g., English, Danish, Dutch, French, German, Italian, Norwegian, Portuguese, Spanish, and Swedish).

In one embodiment, the driver provides UIs in different languages, without having to install a different driver for each language, without having to reinstall the current driver, without having to manually select a language or install a separate language pack, and without having to create multiple printer definitions.

In one embodiment, the driver automatically selects and presents the supported language closest the operating system's language settings for the currently-logged-in user. For example, if the user has configured the operating system to use Canadian-French, then the driver presents UIs in French. In cases where the user's settings do not match any of the supported languages, the driver attempts to match the operating system's base language to one of the supported languages. If the driver still cannot find a match, English is used as the ultimate fallback language, with a warning or message to the user, or with a chance to load or provide a new module or program for a new language.

In one embodiment, the driver supports multiple languages for different users on the same system without having to install different drivers or language packs for each language, without having to reinstall the driver or reconfigure the driver, without having to create multiple printers, and without having to recreate or modify the existing printer, which is very convenient for the users of the same system. The driver dynamically changes to match the language of the currently-logged-on user. The users are identified by name, ID numbers, biometrics, fingerprint recognition, face recognition, signature recognition, iris recognition, password, smart cards, smart phones, RFID tag, badge, encryption key, PKI key, or the like, using a keyboard, camera, scanner, tablet, entry module, verification module, biometrics module, or the like, attached to the main system.

In one embodiment, in the case where the printer is shared, the driver automatically provides the appropriate language on the client system, as well, even if the language of the user on the client system is different from the language of the user on the server. In fact, multiple clients with multiple different languages can all connect to the same printer, and the appropriate language is provided to each client user. This is done without the need for different printer definitions or different servers.

In one embodiment, in cases where multiple users can be logged into the same system simultaneously, each user gets his/her appropriate language, even when the users are configured for different languages.

In one embodiment, if the user changes his/her language preferences in the operating system, the driver automatically matches the new language preferences (as described above) without having to install a different driver or language pack, without having to reinstall or reconfigure the driver, and without having to recreate the printer or change its settings. In one embodiment, in cases where the printer is shared and the language changes on a connecting client system, the same dynamic language adjustment automatically occurs without any configuration changes.

In one embodiment, based on configuration settings in the server, the driver is able to present additional information to the user at the print time, as well as request user input. This is done outside of the normal driver UIs through a tray client mechanism that is distributed with the driver. The tray client is launched when a document is printed, if it is not already running. The information communicated through the tray client includes the following:

Inform the user of the anticipated cost of the job.
Allow the user to manually adjust the cost of the job.
Prompt the user for custom document attributes and additional comments.
Prompt the user for billing account information to associate with the document.
Prompt the user for destination information.
Prompt the user for rerouting information when a problem is encountered with the original destination device.

In one embodiment, based on security and accounting settings in the server, the print job can be rejected, and the user is notified accordingly. In one embodiment, the user's boss is also notified on the status of the job and possible rejection of the job. In one embodiment, the user can interfere and correct the situation. In one embodiment, another user can interfere and correct the situation. In one embodiment, a table of list of authorities and their rank or order is supplied to the system, to determine, e.g., who has authority on whom, who should be notified, who can correct or interfere in a situation, who can negate or stop an action by a user, who is the boss, or the like.

FIG. 1 is for one embodiment, as an example, for a system for multiple users and multiple languages. The language assignment is based on rules and printing preferences database, which is changed or set by the input module.

Figure 2:
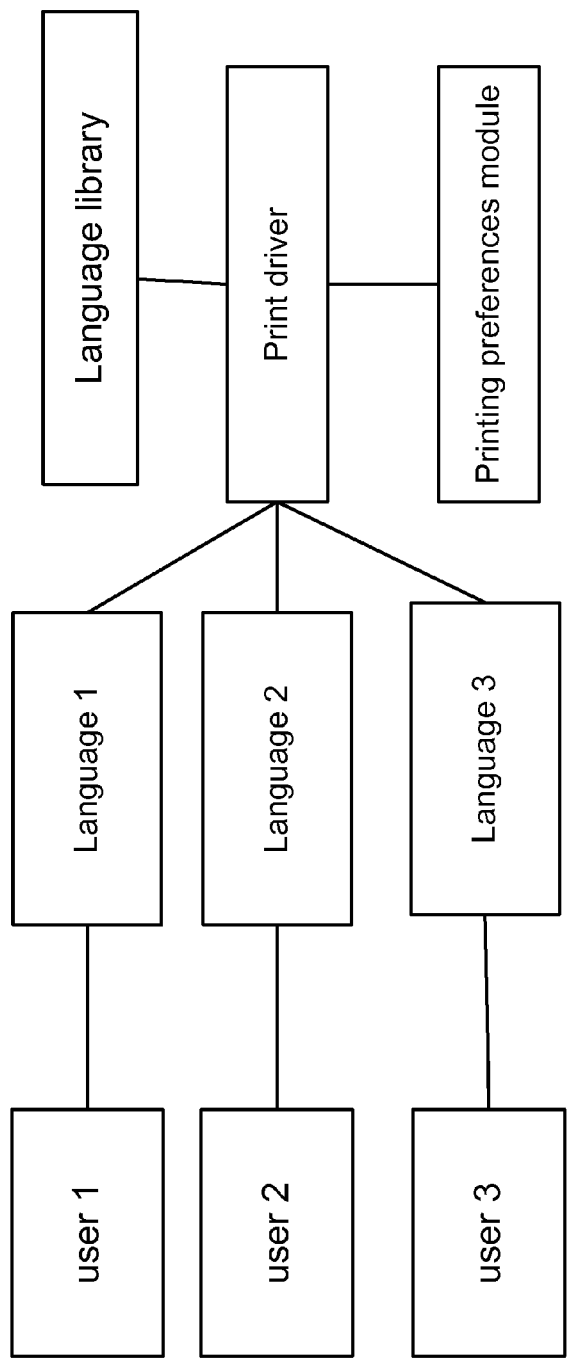
FIG. 2 is for one embodiment, as an example, for a system for multiple users and multiple languages.

FIG. 2 is for one embodiment, as an example, for a system for multiple users and multiple languages. The print driver is related to printing preferences database or module and language library or collection of templates or translations.

Figure 3:
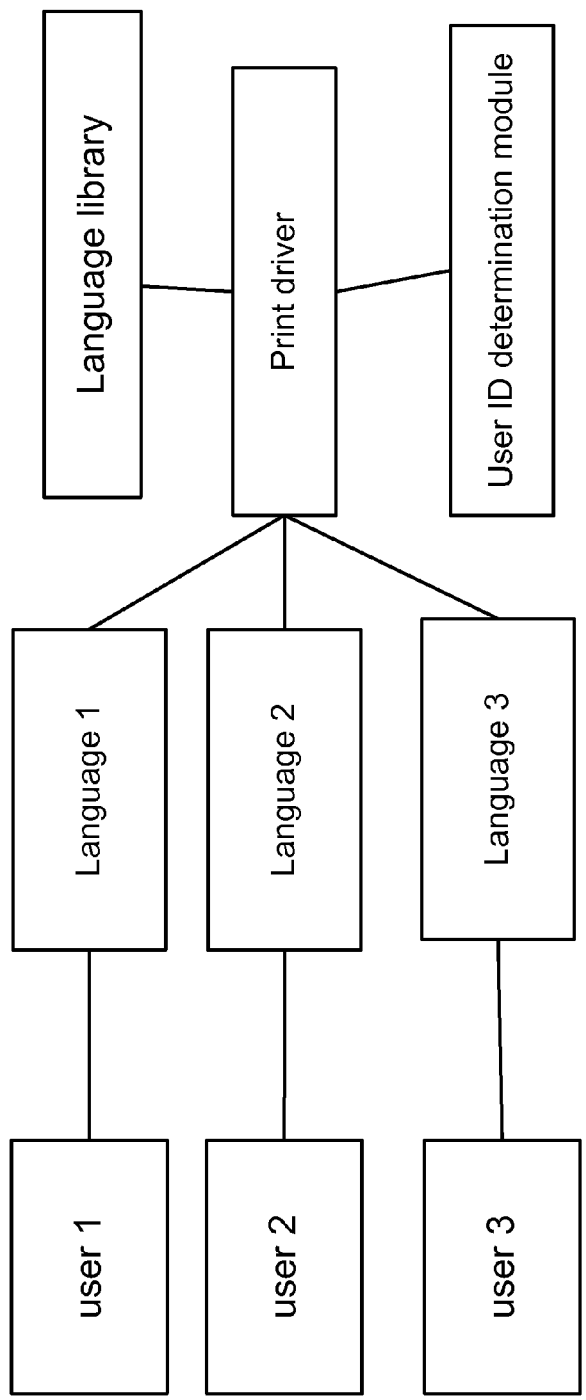
FIG. 3 is for one embodiment, as an example, for a system for multiple users and multiple languages.

FIG. 3 is for one embodiment, as an example, for a system for multiple users and multiple languages. The print driver is related to user ID/identification determination module and language library or collection of templates or translations.

Figure 4:
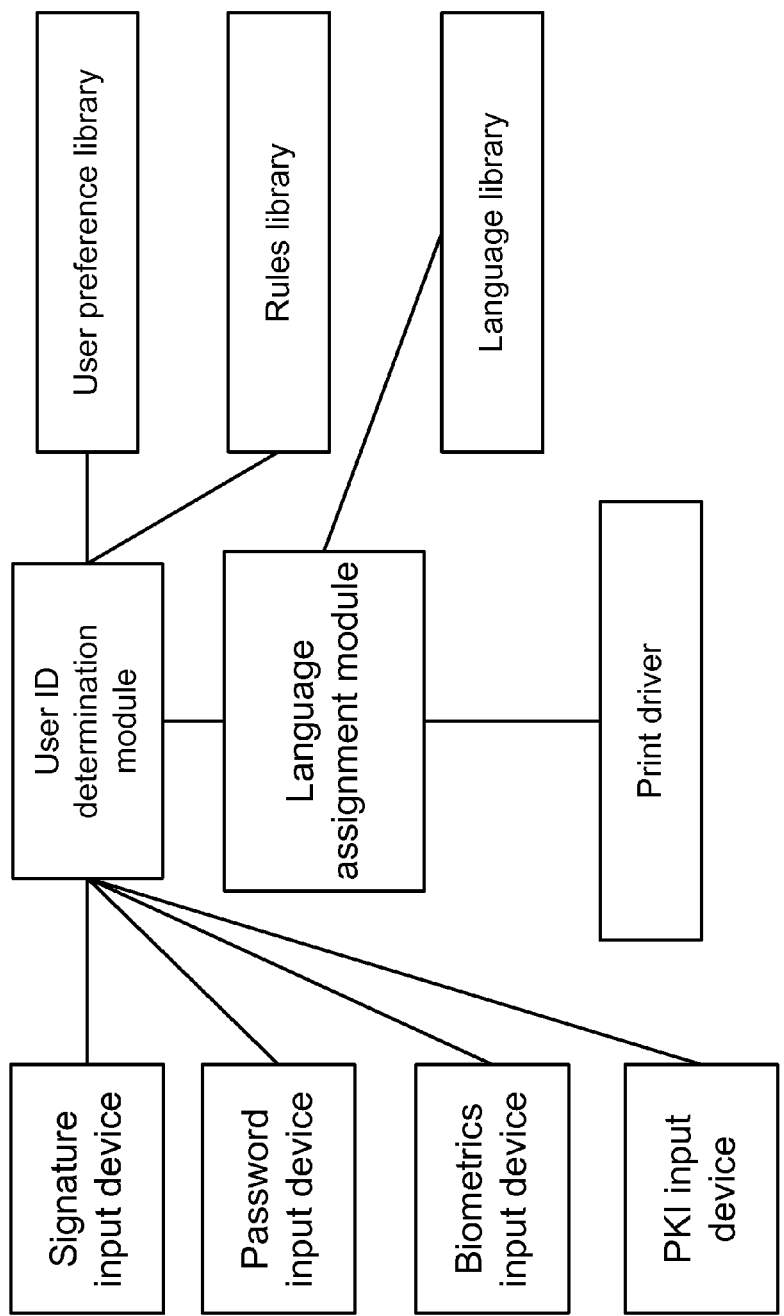
FIG. 4 is for one embodiment, as an example, for a system for various ways of user identification.

FIG. 4 is for one embodiment, as an example, for a system for various ways of user identification, for user ID determination module (based on rules library and user preference library) for language assignment for print driver, based on a language library.

Figure 5:
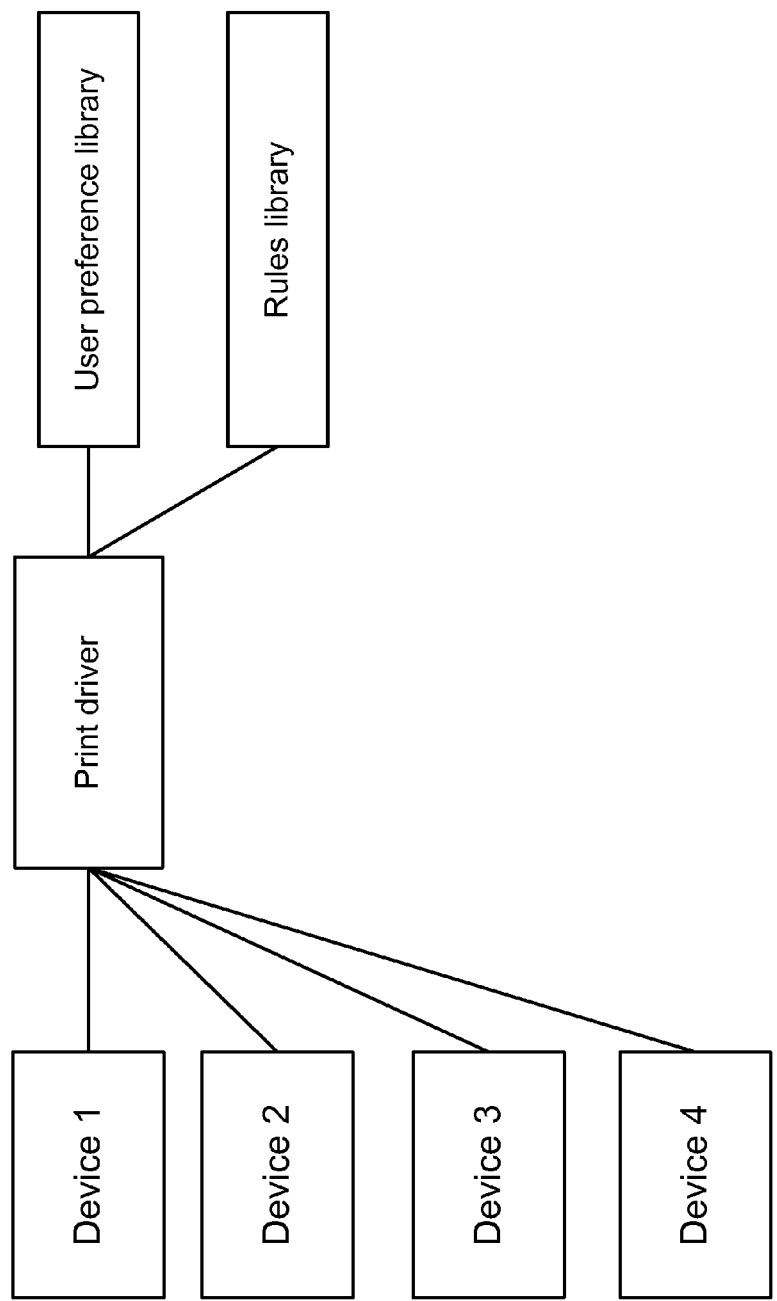
FIG. 5 is for one embodiment, as an example, for a system for multiple devices.
Figure 6:
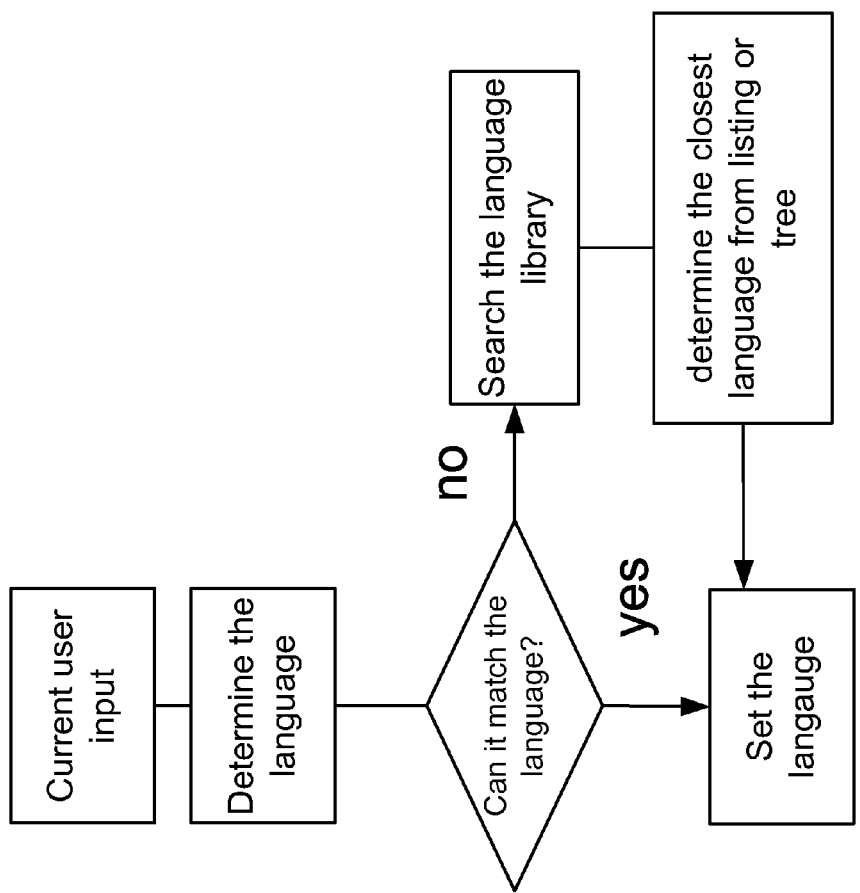
FIG. 6 is for one embodiment, as an example, for a method for matching language.
Figure 7:
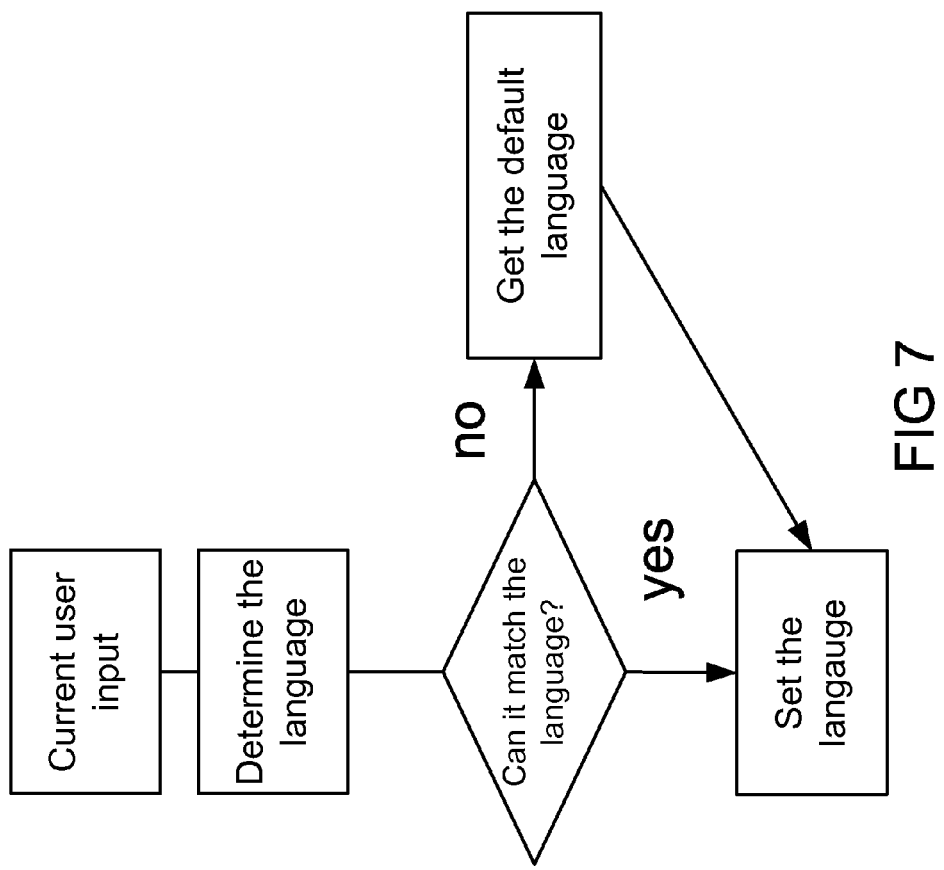
FIG. 7 is for one embodiment, as an example, for a method for setting a default language.

FIG. 5 is for one embodiment, as an example, for a system for multiple devices, based on a print driver, using user preference library and rules library. FIG. 6 is for one embodiment, as an example, for a method for matching language, e.g. to the exact or a closest match. FIG. 7 is for one embodiment, as an example, for a method for setting a default language, e.g. English, if the good match is not found.

Figure 8:
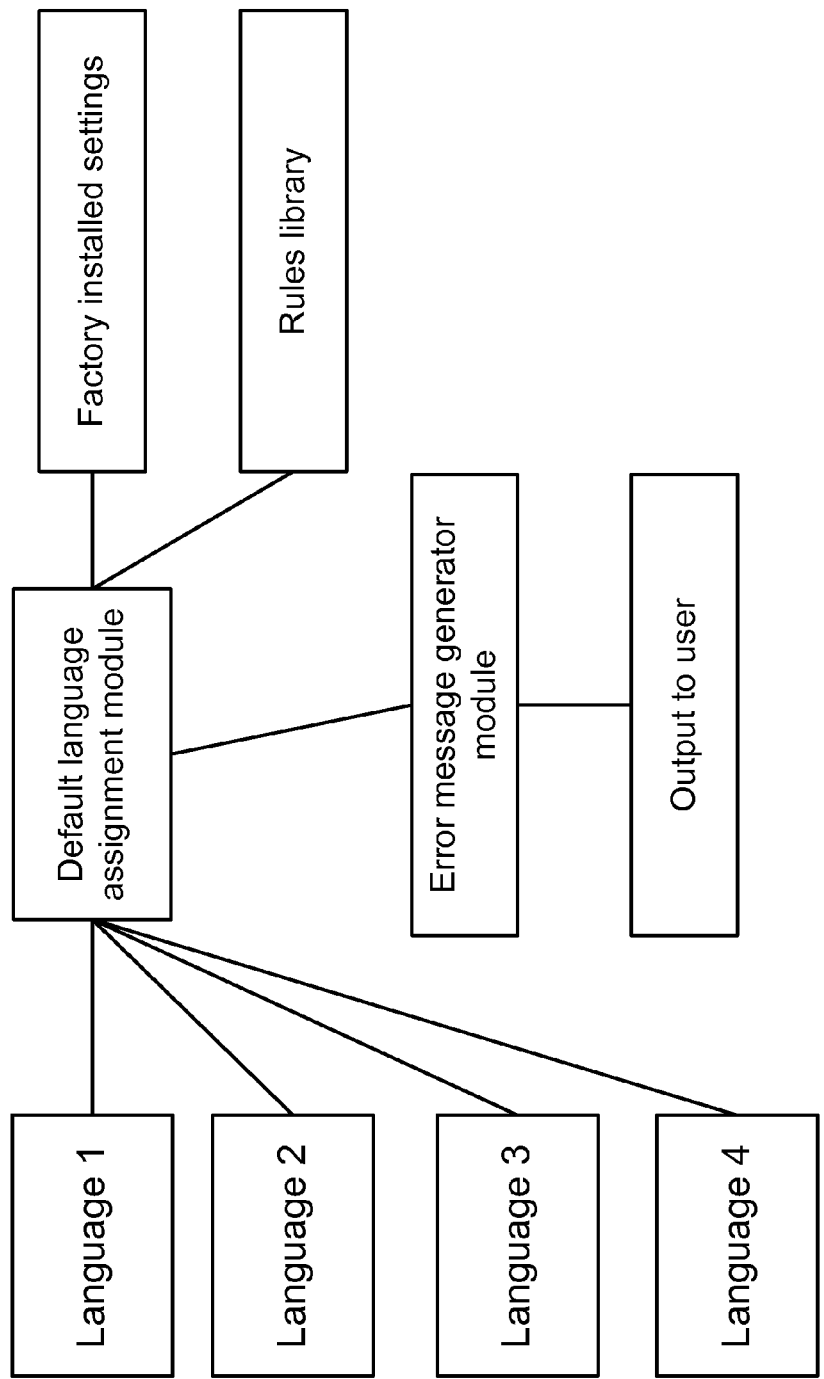
FIG. 8 is for one embodiment, as an example, for a system for setting a default language.

FIG. 8 is for one embodiment, as an example, for a system for setting a default language, from multiple choices of language, based on rules and factory installed settings. It generates error message or notice to the user or admin, to let them know about the default chosen.

Figure 9:
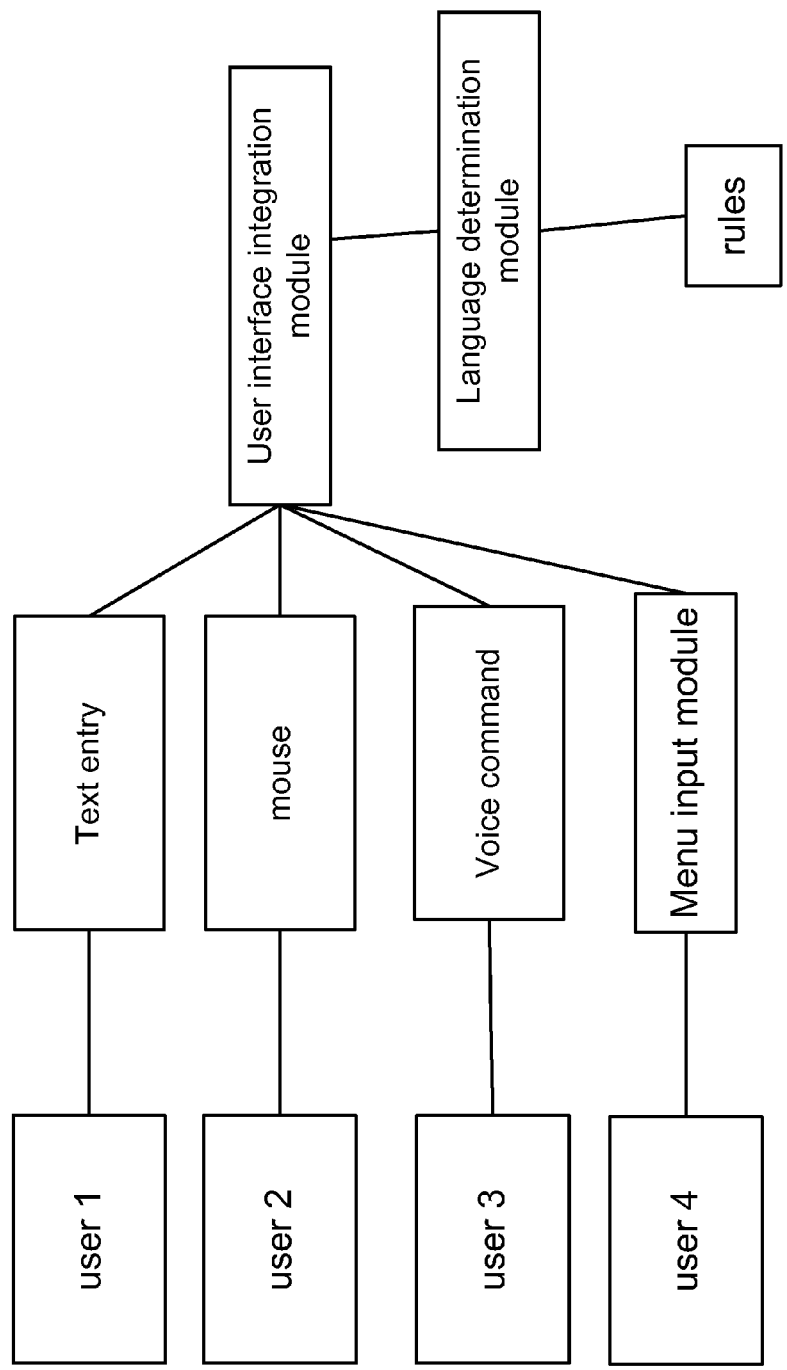
FIG. 9 is for one embodiment, as an example, for a system for various user interfaces.
Figure 10:
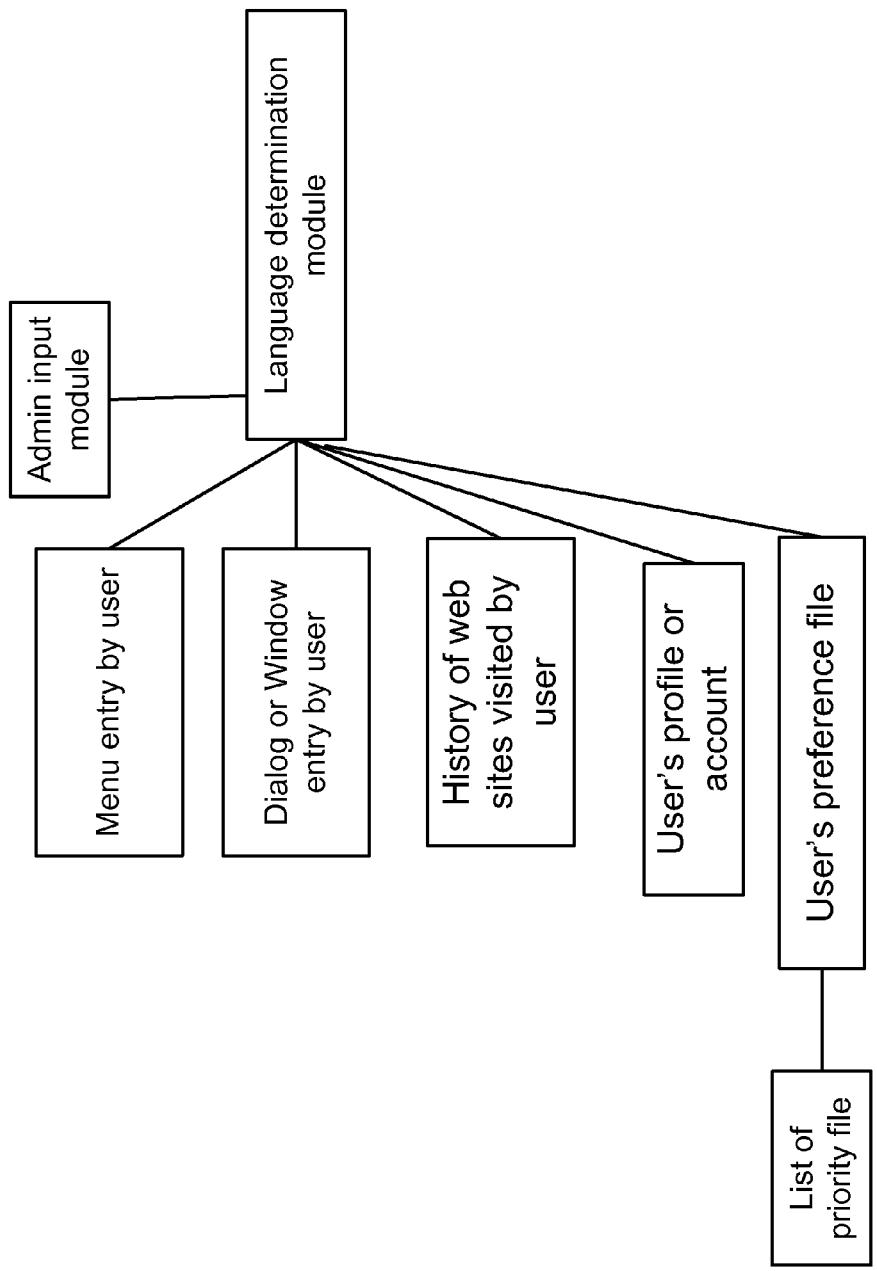
FIG. 10 is for one embodiment, as an example, for a system for various language determination techniques.

FIG. 9 is for one embodiment, as an example, for a system for various user interfaces, which is connected to language determination module, based on rules. FIG. 10 is for one embodiment, as an example, for a system for various language determination techniques, from a user, an admin, or a list of priority file.

Figure 11:
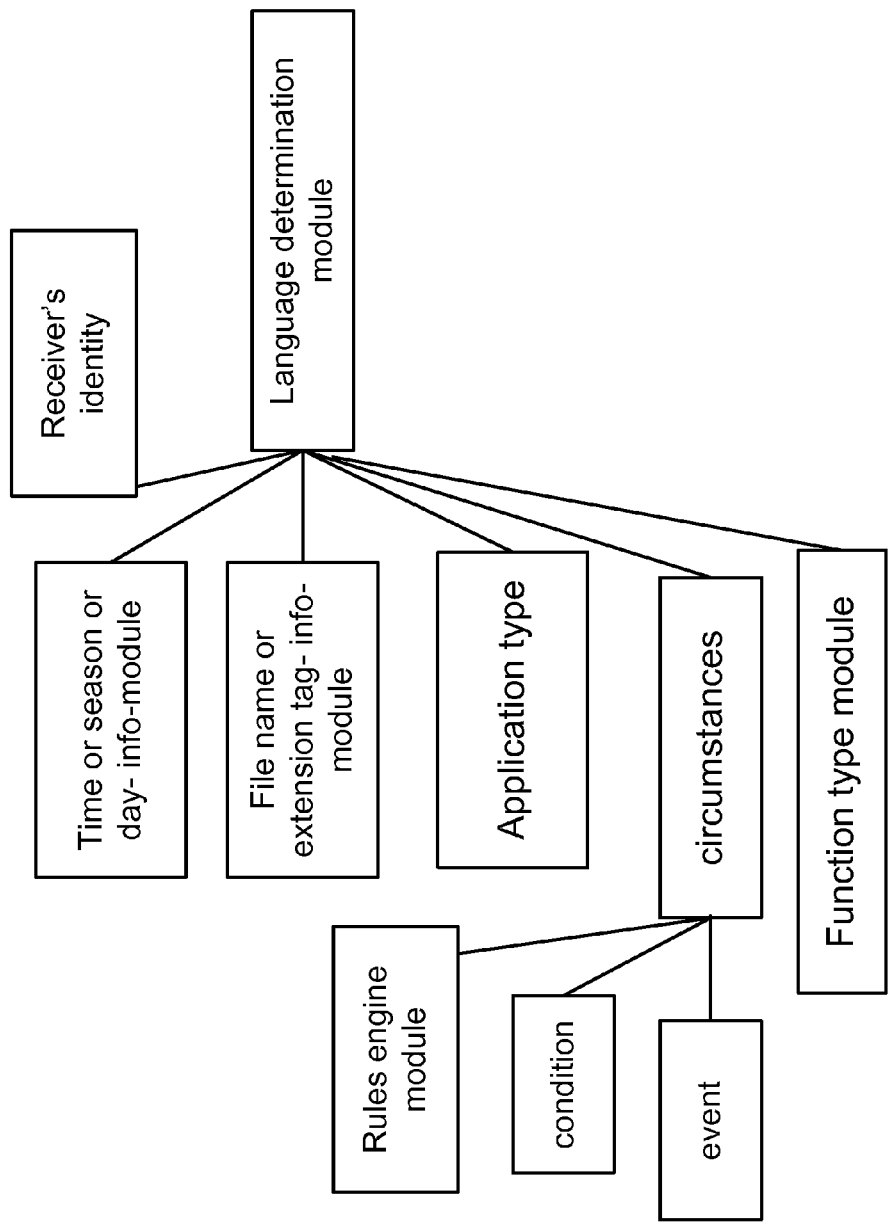
FIG. 11 is for one embodiment, as an example, for a system for various language determination parameters or factors.
Figure 12:
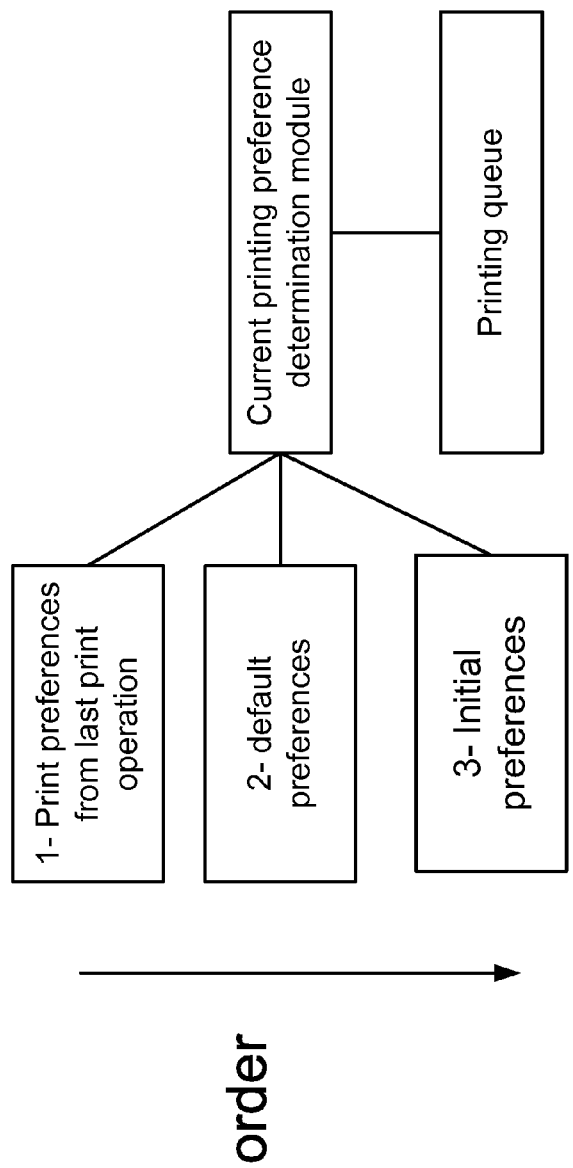
FIG. 12 is for one embodiment, as an example, for a system for various factors for current printing preference determination module.

FIG. 11 is for one embodiment, as an example, for a system for various language determination parameters or factors. FIG. 12 is for one embodiment, as an example, for a system for various factors (in a ranking order) for current printing preference determination module, which is connected to a printing queue.

Figure 13:
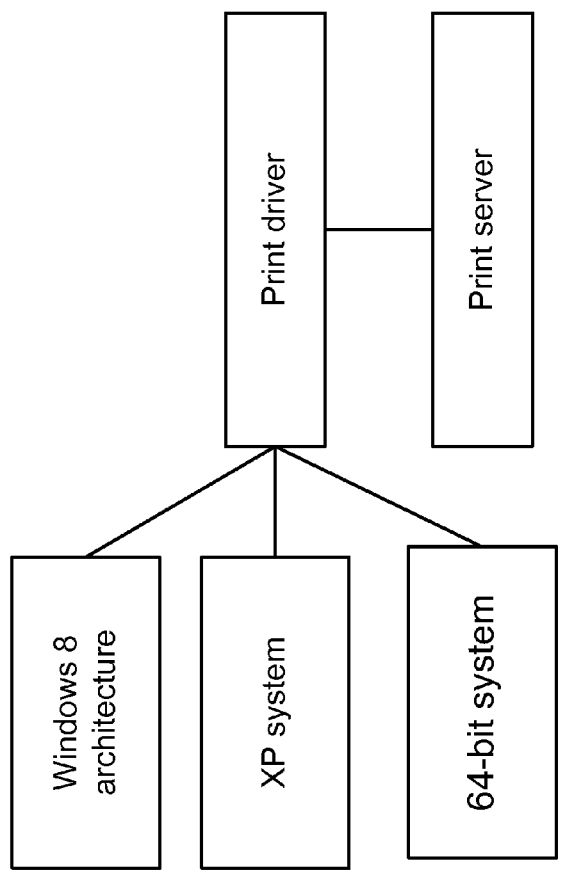
FIG. 13 is for one embodiment, as an example, for a system for various operating systems or architectures.
Figure 14:
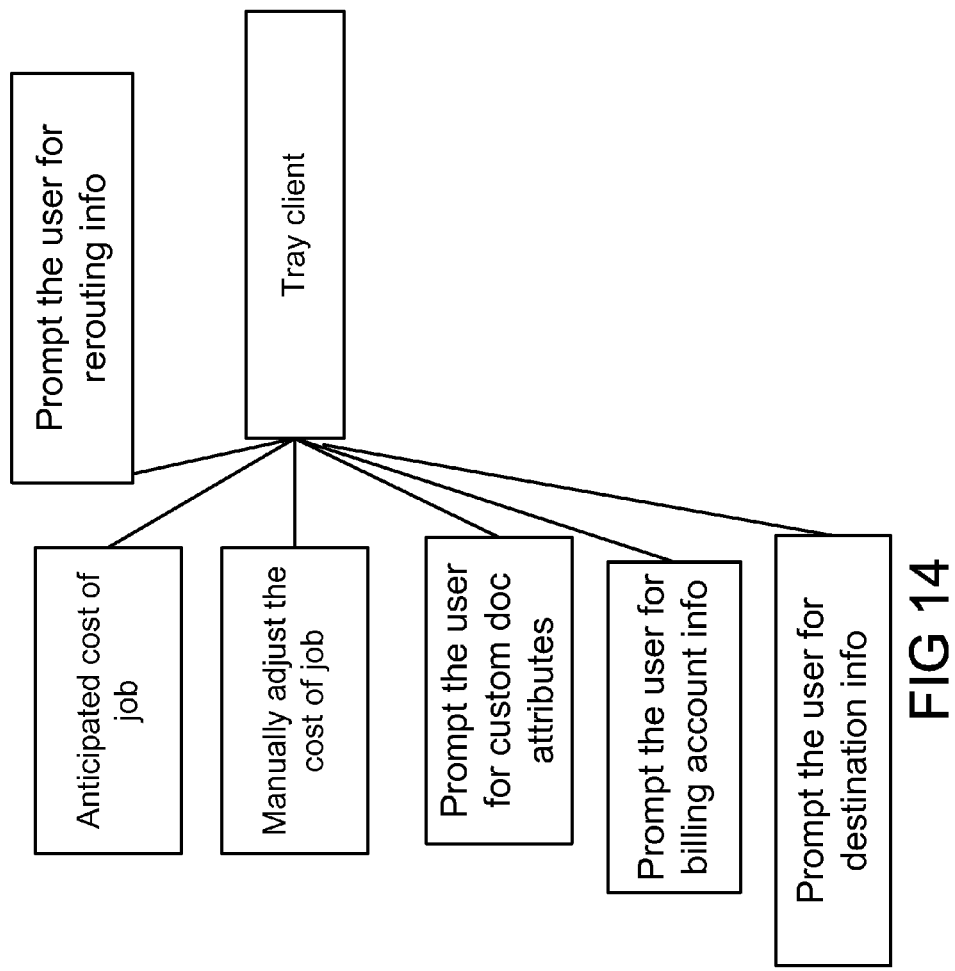
FIG. 14 is for one embodiment, as an example, for a system for various functions related to the tray client.
Figure 15:
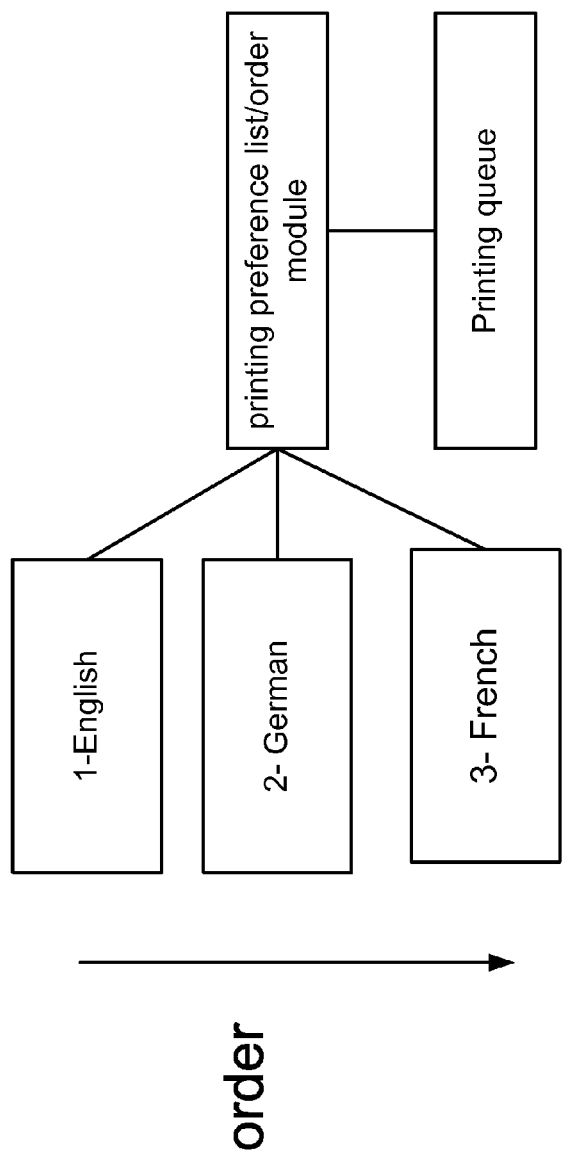
FIG. 15 is for one embodiment, as an example, for a system for various language choices, in an ordered list.

FIG. 13 is for one embodiment, as an example, for a system for various operating systems or architectures, for a print driver, for a print server. FIG. 14 is for one embodiment, as an example, for a system for various functions related to the tray client. FIG. 15 is for one embodiment, as an example, for a system for various language choices, in an ordered list, for printing preference list or order, which is connected to a printing queue. We can use a loop for going through the list of ranking in order it is listed.

FIG. 16 is for one embodiment, as an example, for a system for various authorities, in an ordered list, for authority or rank list or order database, for action or printing authority module, for controlling the actions by various authorities and persons in an organization with various authorization limitations or levels. We can use a loop for going through the list of ranking in order it is listed.

Implementations of the invention may be made in hardware, firmware, software, or any suitable combination thereof. The invention may also be implemented as instructions stored on a machine-readable medium that can be read and executed on one or more processing devices. For example, the machine-readable medium may include various mechanisms that can store and transmit information that can be read on the processing devices or other machines (e.g., read only memory, random access memory, magnetic disk storage media, optical storage media, flash memory devices, or any other storage or non-transitory media that can suitably store and transmit machine-readable information). Furthermore, although firmware, software, routines, or instructions may be described in the above disclosure with respect to certain exemplary aspects and implementations performing certain actions or operations, it will be apparent that such descriptions are merely for the sake of convenience and that such actions or operations in fact result from processing devices, computing devices, processors, controllers, or other hardware executing the firmware, software, routines, or instructions. Moreover, to the extent that the above disclosure describes executing or performing certain operations or actions in a particular order or sequence, such descriptions are exemplary only and such operations or actions may be performed or executed in any suitable order or sequence.

Furthermore, we can have server, PC, computing device, processor, microprocessor, mobile device, computer, central processor, distributed processing system, cloud computing, remote processor, or the like, for processing the data and calculation purposes in the teachings above. We also can have RAM, ROM, memory unit, storage, optical disc, CD, magnetic disc, buffer, or the like, for the storage of the data. We can have wireless communication, cable, optical communication, wired, telephonic, electrical, or the like, for modes of communications. We can have ink jet printer, laser printer, ribbon printer, solid source printer, or the like, for the printing devices. We can have commands between components in any high level or low level format or computer language or code.

Any variations of the above teaching are also intended to be covered by this patent application.

The invention claimed is:

1. A method for application of dynamic multilingual print driver, said method comprising:
    a user interface module of a computing system receiving a user's input;
    said computing system receiving information about said user;
    said computing system analyzing said information about said user;
    said computing system determining a language most preferred by said user from said analyzed information about said user;
    said computing system accessing a library of languages;
    said computing system searching said library of languages;
    if said language most preferred by said user is not in said library of languages, then said computing system searching a language second-most preferred by said user from said analyzed information about said user;
    if said language second-most preferred by said user is not in said library of languages, then said computing system assigning a default language for language of a print driver;
    if said language second-most preferred by said user is in said library of languages, then said computing system assigning said language second-most preferred by said user for said language of said print driver;
    if said language most preferred by said user is in said library of languages, then said computing system assigning said language most preferred by said user for said language of said print driver; and
    said computing system applying said language of said print driver for a print job.

2. The method for application of dynamic multilingual print driver as recited in claim 1, wherein the default language includes the third-most preferred language by said user from said analyzed information about said user.

3. The method for application of dynamic multilingual print driver as recited in claim 2, said method further comprising:
    a warning module reporting an error in installation.

4. The method for application of dynamic multilingual print driver as recited in claim 2, said method further comprising:
    a warning module reporting an error in matching language.

5. The method for application of dynamic multilingual print driver as recited in claim 2, said method further comprising:
    receiving information about said user's past behaviors, habits, patterns, and sites visited.

6. The method for application of dynamic multilingual print driver as recited in claim 2, said method further comprising:
    receiving information about said user's account, personal file, or social network data.

7. The method for application of dynamic multilingual print driver as recited in claim 2, said method comprises further comprising:
    choosing a language based on a trigger event.

8. The method for application of dynamic multilingual print driver as recited in claim 2, said method further comprising:
    choosing a language based on a specific time or time period.

9. The method for application of dynamic multilingual print driver as recited in claim 2, said method further comprising:
    choosing a language based on at least one of: a function parameter and an application parameter.

10. The method for application of dynamic multilingual print driver as recited in claim 2, said method further comprising:
    choosing a language based on a ranking user list for multiple users.

11. The method for application of dynamic multilingual print driver as recited in claim 1, said method further comprising:
    a warning module reporting an error in installation.

12. The method for application of dynamic multilingual print driver as recited in claim 1, said method further comprising:
    a warning module reporting an error in matching language.

13. The method for application of dynamic multilingual print driver as recited in claim 1, said method further comprising:
    receiving information about said user's past behaviors, habits, patterns, and sites visited.

14. The method for application of dynamic multilingual print driver as recited in claim 1, said method further comprising:
    receiving information about said user's account, personal file, or social network data.

15. The method for application of dynamic multilingual print driver as recited in claim 1, said method further comprising:
    choosing a language based on a trigger event.

16. The method for application of dynamic multilingual print driver as recited in claim 1, said method further comprising:
    choosing a language based on a specific time or time period.

17. The method for application of dynamic multilingual print driver as recited in claim 1, said method further comprising:
    choosing a language based on at least one of: a function parameter and an application parameter.

18. The method for application of dynamic multilingual print driver as recited in claim 1, said method further comprising:

choosing a language based on a ranking user list for multiple users.

19. A system comprising:

a user interface module of a computing system, the user interface module configured to receive input from a user;

said computing system configured to receive information about said user;

said computing system further configured to analyze said information about said user;

said computing system further configured to determine a language most preferred by said user from said analyzed information about said user;

said computing system further configured to access a library of languages;

said computing system further configured to search said library of languages;

if said language most preferred by said user is not in said library of languages, then said computing system further configured to search a language second-most preferred by said user from said analyzed information about said user;

if said language second-most preferred by said user is not in said library of languages, then said computing system further configured to assign a default language for language of a print driver;

if said language second-most preferred by said user is in said library of languages, then said computing system further configured to assign said language second-most preferred by said user for said language of said print driver;

if said language most preferred by said user is in said library of languages, then said computing system further configured to assign said language most preferred by said user for said language of said print driver; and said computing system further configured to apply said language of said print driver for a print job.

20. A non-transitory computer readable medium having stored thereon a sequence of instructions which, when loaded and executed by a processor coupled to an apparatus, causes the apparatus to:

receive a input from a user;

receive information about said user;

analyze said information about said user;

determine a language most preferred by said user from said analyzed information about said user;

access a library of languages;

search said library of languages;

if said language most preferred by said user is not in said library of languages, then search a language second-most preferred by said user from said analyzed information about said user;

if said language second-most preferred by said user is not in said library of languages, then assign a default language for language of a print driver;

if said language second-most preferred by said user is in said library of languages, then assign said language second-most preferred by said user for said language of said print driver;

if said language most preferred by said user is in said library of languages, then assign said language most preferred by said user for said language of said print driver; and apply said language of said print driver for a print job.

* * * * *